United States Patent
Carsello

Patent Number: 5,832,038
Date of Patent: Nov. 3, 1998

[54] METHOD AND APPARATUS FOR CLASSIFYING A MULTI-LEVEL SIGNAL

[75] Inventor: Stephen Rocco Carsello, Fort Worth, Tex.

[73] Assignee: Motorola, Inc., Shaumburg, Ill.

[21] Appl. No.: 763,386

[22] Filed: Dec. 16, 1996

[51] Int. Cl.$^6$ .............................. H03K 9/00; H04L 27/06; H04L 27/14; H04L 27/22
[52] U.S. Cl. ........................ 375/316; 375/287; 455/226.1
[58] Field of Search ...................... 375/286, 287, 375/264, 259, 316, 224, 343, 340, 377, 335, 272, 332, 280; 371/56; 382/224, 227; 324/158.1, 76.11; 455/226.1, 67.1; 364/604, 728.03, 728.05, 819

[56] References Cited

U.S. PATENT DOCUMENTS

| | | |
|---|---|---|
| Re. 30,182 | 12/1979 | Howson . |
| 3,679,977 | 7/1972 | Howson . |
| 4,816,820 | 3/1989 | Davis . |
| 5,311,554 | 5/1994 | Morera et al. . |
| 5,448,206 | 9/1995 | Newhall .................................. 332/103 |
| 5,450,612 | 9/1995 | Chanroo . |
| 5,533,062 | 7/1996 | Liberti . |
| 5,563,910 | 10/1996 | Mellone . |
| 5,651,030 | 7/1997 | Wong et al. ............................. 375/316 |

*Primary Examiner*—Huy D. Vu
*Assistant Examiner*—Jean B. Corrielus
*Attorney, Agent, or Firm*—Eduardo Guntin

[57] ABSTRACT

A radio receiver circuit (100) is used for receiving a multi-level signal from a radio communication system. The multi-level signal includes a plurality of symbols, wherein each level is representative of a symbol of data. The receiver circuit (100) includes a demodulator circuit (106) and a digital circuit (112). The demodulator circuit (106) is used for receiving the multi-level signal and for generating baseband samples for each symbol, whereby each sample has a phase and a signal level. The digital circuit (112) is coupled to the demodulator circuit (106), and is adapted to tally, by category, occurrences of the baseband samples, whereby each category is representative of one of a plurality of phases, and one of a plurality of signal level ranges. The digital circuit (112) is further adapted to correlate the categories to at least one predetermined template, and to classify the multi-level signal according to the correlation results.

15 Claims, 13 Drawing Sheets

100

400

5,832,038
METHOD AND APPARATUS FOR CLASSIFYING A MULTI-LEVEL SIGNAL

RELATED APPLICATION

This application is related to, and applicants hereby claim the benefit of the prior filing date of, a co-pending U.S. Provisional application Ser. No. 60/021,221 entitled "Method and Apparatus in a Radio Communication System for Classifying Signals," filed Jul. 3, 1996 by the same inventor as the present non-provisional application.

FIELD OF THE INVENTION

This invention relates in general to receiving multi-level radio signals, and particularly to the classification of multi-level signals.

BACKGROUND OF THE INVENTION

With the proliferation of signaling protocols, many radio communication systems today modulate messages using a hybrid of multi-level signaling techniques such as, for example, 2-level FSK (frequency shift keyed) signaling, and 4-level FSK signaling. Each technique can have multiple baud rates such as, for example, 4-level FSK signaling at 6400 bits per second (bps), 3200 bps, or 1600 bps, and 2-level FSK signaling at 3200 bps or 1600 bps. Moreover, each technique may also have multiple frequency deviations for each symbol of data, e.g., a 4-level FSK signal can have deviations at ±800 Hz and ±2400 Hz, or at ±1600 Hz and ±3200 Hz.

In practice, a selective call receiver (SCR) that receives messages from the communication system is required to search for a control channel that transmits messages in a signaling format consistent with that used by the SCR. Traditionally, the SCR uses baud rate detection to determine if a proper signal is present on a given channel by examining a short burst of a signal transmitted by the radio communication system. This method allows the SCR to quickly detect if a channel has an active signal.

However, this method requires that symbol levels of a multi-level signal be known in order to examine zero crossings of the recovered waveform. The zero crossings are used to detect the symbol rate of the signal, i.e., its baud rate. Because signal levels are traditionally derived from the received signal, the baud rate detection process is data-dependent, and at times subject to error. An error occurs when a long string of identical symbols is received. In this situation, the baud rate detector is unable to determine the levels of the multi-level signal, and therefore cannot determine the location of the zero crossings to calculate a baud rate. Moreover, the performance of a traditional baud rate detector is further degraded by spreading of the zero crossings due to an inherent characteristic of multi-level signals.

Lastly, traditional baud rate detection cannot classify a multi-level signal by its frequency deviations. That is, it may provide the same result for a 4-level FSK signal having frequency deviations at ±800 Hz and ±2400 Hz, or at ±1600 Hz and ±3200 Hz. Hence, the SCR may incorrectly intercept a 4-level FSK signal with the wrong frequency deviations.

Thus, what is needed is a method and apparatus that allows SCR to properly classify a multi-level signal by its baud rate and signal levels.

DESCRIPTION OF THE PREFERRED EMBODIMENT

Figure 1:
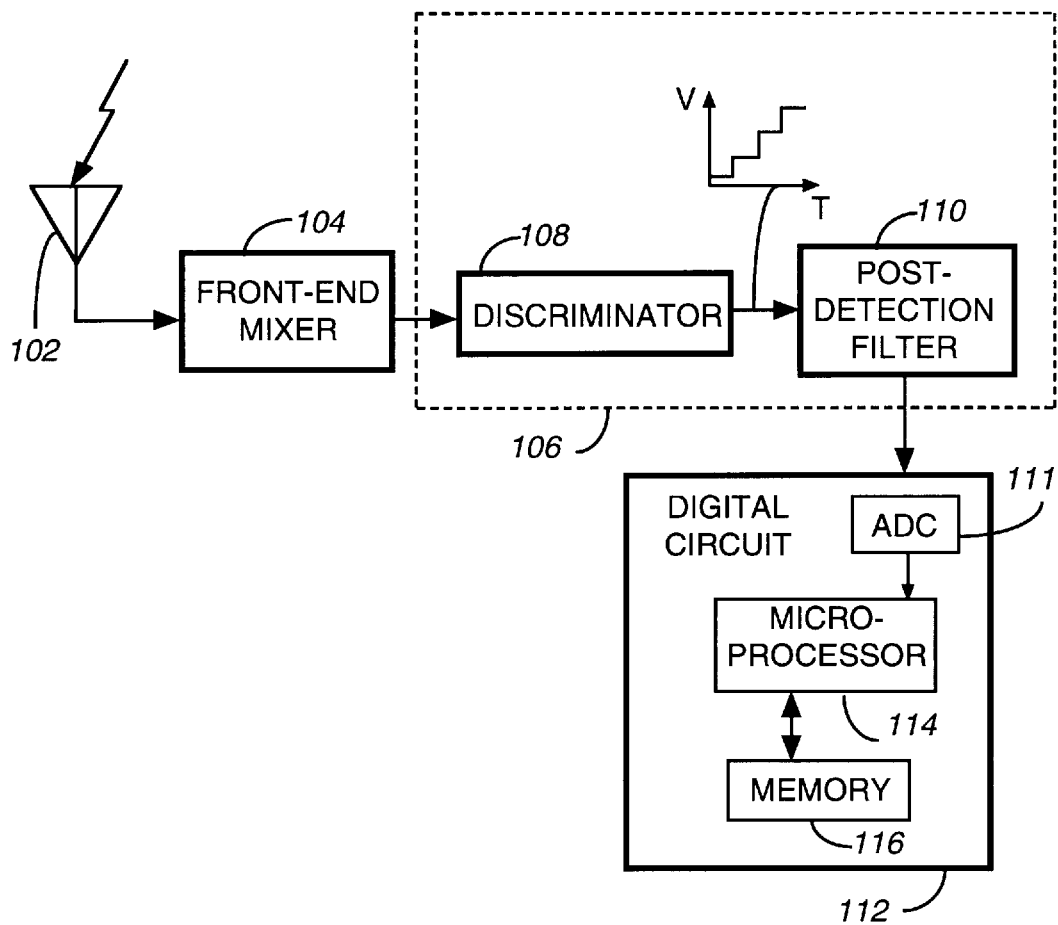
FIG. 1 is an electrical block diagram of a radio receiver circuit according to the present invention.

FIG. 1 is an electrical block diagram of a radio receiver circuit 100 according to the present invention. The radio receiver circuit 100 comprises a conventional radio antenna 102, a conventional front-end mixer 104, a demodulator circuit 106 and a digital circuit 112 for receiving a multi-level signal from a radio communication system, in which each level is representative of a symbol of data and wherein the multi-level signal comprises a plurality of symbols. The demodulator circuit 106 comprises a discriminator 108 and a post-detection filter 110.

The radio antenna 102 receives an RF (radio frequency) multi-level signal and provides a corresponding electrical signal to the front-end mixer 104. The front-end mixer 104 uses conventional means, well known in the art, to mix down the multi-level signal and thereby generate an IF (intermediate frequency) signal. The discriminator 108 converts the IF signal to a multi-level voltage output. FIG. 1 depicts the signal generated by the discriminator 108 as a 4-level signal. The post-detection filter 110 filters the output of the discriminator 108 to eliminate high frequency noise.

The output of the post-detection filter 110 is then processed by the digital circuit 112. This is accomplished by sampling the output of the post-detection filter 110 with an ADC (analog-to-digital converter) 111 included in the digital circuit 112. The ADC 111 generates baseband samples for each symbol of the multi-level signal. Alternatively, the discriminator 108, and the post-detection filter 110 can be implemented with conventional digital circuits, in which case, the ADC 111 would be placed at the input of the discriminator 108.

As will be described below, the digital circuit 112 is used for classifying a multi-level signal intercepted by the radio receiver circuit 100. The classification includes determining the number of levels of the multi-level signal (e.g., 2-level, 4-level, 8-level, etc.) and the baud rate, e.g., 1600 sps (symbols per second), 3200 sps, etc.

The digital circuit 112 implements the processing steps discussed below with a software algorithm. The software algorithm is operated from a microprocessor 114 and a memory 116, included in the digital circuit 112, which processes the output of the ADC 111 according to the present invention. Alternatively, the microprocessor 114 and memory 116 can be replaced with an algorithmic state machine, which is contained in an ASIC (application specific integrated circuit). In this embodiment, the power efficiency of the digital circuit 112 is better than that of the microprocessor 114 and memory 116 combination.

The discussions that follow are focused on the process of detecting a 4-level FSK signal at a baud rate of 3200 sps with frequency deviations referenced to a common carrier (e.g., 900 MHz) at ±800 Hz and ±2400 Hz. Note, however, that the digital circuit 112 can be adapted to detect other levels and other baud rates of a multi-level signal. Moreover, it should be understood that the digital circuit 112 can be adapted to other signaling formats such as, for example, a multi-level QAM (quadrature amplitude modulation) signal, and multi-level PSK (phase shift keyed) signal.

Because of the complexity of the type of problems solved by the present invention, discussions related to FIGS. 2–7 are meant to be helpful to the reader in understanding the processing steps of the invention.

Figure 2:
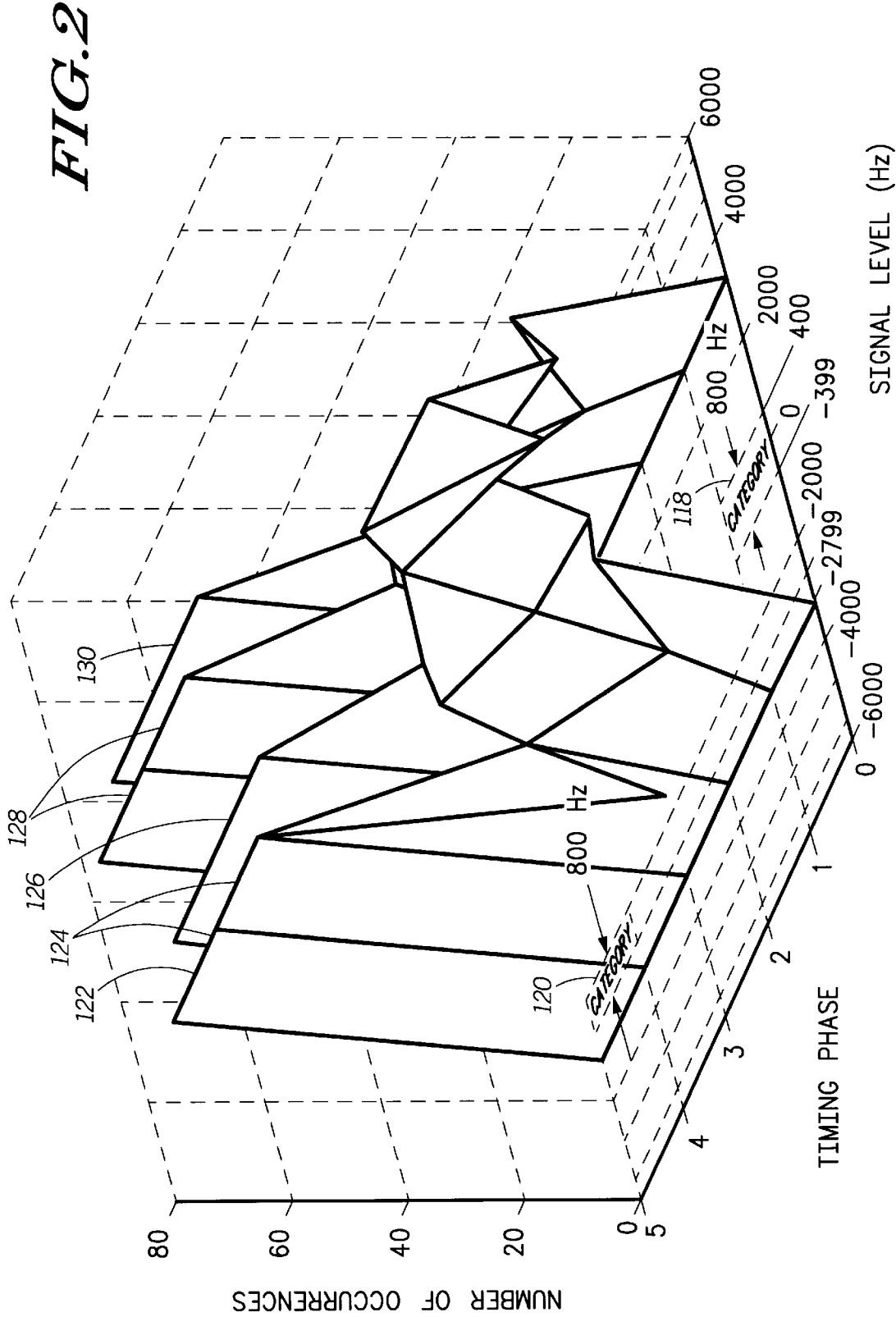
FIG. 2 is a graph depicting a histogram of tallied occurrences for a 6400 bits per second 4-level FSK signal with no frequency offset.

As a first step in the classification process, the digital circuit 112 is adapted to tally, by category, occurrences of the baseband samples generated by the ADC 111. Each category is representative of one of a plurality of phases, and one of a plurality of signal level ranges. FIG. 2 is a graph depicting a histogram of tallied occurrences of baseband samples of a 3200 sps 4-level FSK signal. The graph depicted in FIG. 2 assumes that the front-end mixer 104 is frequency locked (i.e., no frequency offset) with the 4-level FSK signal. That is, a conventional reference oscillator (not shown in FIG. 1), which is used by the front-end mixer 104 to mix down the multi-level signal, is operating at a frequency that is substantially locked with the carrier frequency of the multi-level signal (e.g., 900 MHz), thereby generating an IF signal at a desired frequency of, for example, 455 KHz.

The graph shown comprises three axis's: a signal level axis, a timing phase axis, and an axis representative of tallied occurrences of the baseband samples. The signal level axis shown is divided into a plurality of signal level ranges depicted in frequency. In the present example, the signal level ranges are in blocks of 800 Hz. For example, from the center of the axis the ranges are: −399 to +400 Hz, −400 to −1199 Hz, +401 Hz to +1200 Hz, −1200 Hz to −1999 Hz, +1201 Hz to +2000 Hz, −2000 Hz to −2799 Hz, and +2001 Hz to +2800 Hz.

The timing phase axis is divided into six phases (0 through 5). The occurrences axis is unitless, and represents the number of occurrences in which the baseband samples, having a particular absolute phase and signal level, fall within a phase and signal level range of the graph. The occurrences axis can be expressed mathematically as $h(\theta,s)$, where $\theta$ is one of a plurality of phases, and s is one of a plurality of signal level ranges. Hence, the two-dimensional plane, comprising the timing phase axis and the signal level axis, forms an array (or matrix) of categories (see FIG. 2). Data tallied in each category is represented by the function $h(\theta,s)$.

FIG. 2 shows two categories 118, 120 for illustration. Category 118 has a signal level range from −399 to +400 Hz, and a phase of 0. Similarly, category 120 has a signal level range from −2000 Hz to −2799 Hz, and a phase of 4. Hence, category 118 tallies baseband samples that have a phase of 0 and a signal level range between −399 to +400 Hz, while category 120 tallies baseband samples that have a phase of 4 and a signal level range between −2000 Hz to −2799 Hz. Note the frequency range of each category is 800 Hz.

Each baseband sample, as mentioned above, has an absolute phase and signal level. Thus, when tallying an occurrence of a baseband sample, the occurrence is recorded in a category that has a phase and signal level range corresponding to the absolute phase and signal level of the baseband sample. For example, a baseband sample having a phase of 4 and a signal level of −2300 Hz will be recorded as an occurrence in category 120, which has a phase of 4 and signal level range from −2000 Hz to −2799 Hz. Every time category 120 tallies an occurrence, its magnitude of occurrences increases, thereby increasing histogram 122, which corresponds to category 120. This process occurs for each category. Once all samples have been categorized and tallied, a plurality of histograms for each phase (similar to the one shown in FIG. 2) results.

In the present example, a sampling window of 90 ms (milliseconds) is used for tallying data in the categories. At a rate of 3200 sps, the sampling window comprises 288 symbols of data (i.e., 3200 sps×90 ms), each symbol representative of two bits of digital data. Assuming a sampling rate of 19.2 KHz, the total number of samples per symbol is 6 (i.e., 19.2 KHz/3200 sps), thereby providing a total of 1728 samples (i.e., 288×6) for the sampling window.

From a three dimensional perspective, FIG. 2 depicts, in the form of a histogram, the number of occurrences of baseband samples per category. It is apparent from the graph that between phases 3, 4 and 5 there are four distinct peaks 124, 126, 128, 130. Peaks 124, 126, 128, 130 are an indication that sampling the 4-level FSK signal is best at these phases. That is, these phases tend to sample the 4-level FSK signal closer to the midpoint of the symbol than phases 0, 1, and 2. Since sampling of the 4-level FSK signal is performed asynchronously, the phase(s) at which the demodulated waveform takes on the expected symbol deviation frequencies is not known.

Figure 3:
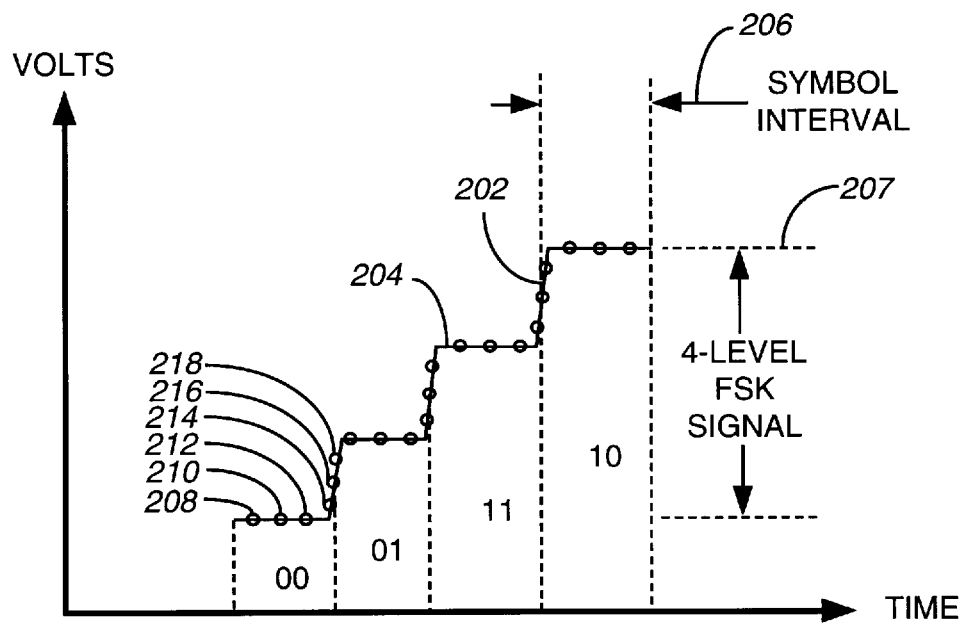
FIGS. 3 and 4 each depict a 4-level FSK signal sampled at different phases.
Figure 4:
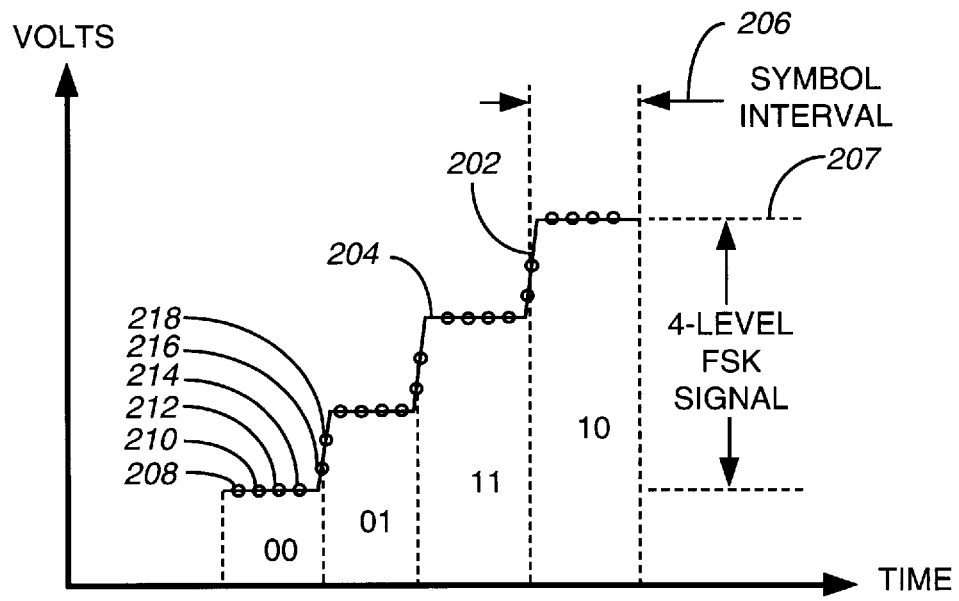

For example, FIGS. 3 and 4 each depict a 4-level FSK signal 207 sampled at different phases. A symbol interval 206 is depicted in FIGS. 3 and 4 by dashed lines. There are six baseband samples 208, 210, 212, 214, 216, 218 per symbol (a baseband sample is represented by circles). Each of the baseband samples represents a phase. For example, baseband sample 208 represents phase 0, 210 represents phase 1, . . . , 218 represents phase 5. Each of these phases corresponds to the phases of FIG. 2 (i.e., phases 0 through 5). Moreover, each symbol is representative of a particular digital code (illustrated by way of example as "00," "01," "11" and "10").

When the 4-level FSK signal is initially received, it is not clear in what location the symbols were sampled. In the case of an extremely flat symbol waveform, all baseband samples may land at the expected symbol frequency deviations 204. However, during asynchronous sampling, not all baseband samples land at the symbol frequency deviation 204. In fact, some samples land at a symbol transition 202. Baseband samples occurring at symbol transitions 202 will vary in signal levels significantly when compared to baseband samples occurring at symbol frequency deviations 204.

Because of the large variance in the signal level (which translates to a variance in frequency) of baseband samples occurring at symbol transitions 202, tallying of these samples will tend to spread through more than one of the categories of FIG. 2, while baseband samples occurring at symbol frequency deviations 204 will be recorded in the same category. Hence, in the example of FIG. 3, the phases 0 through 2 for baseband samples 208, 210, and 212, which occur at symbol frequency deviations 204, will have a higher incidence of recorded occurrences than the remaining phases 3 through 5. The result if plotted, would be four peaks at phases 0 through 2, and no apparent peaks at the remaining phases 3 through 5, which is analogous to the result shown in FIG. 2. FIG. 4 shows an example where four phases occur at symbol frequency deviations 204. The result in this case would be four peaks at phases 0 through 3. In the best case, where all baseband samples occur phases at symbol frequency deviations 204, four distinct peaks would be depicted at phases 0 through 5 (i.e., all phases).

Although the above method is useful in classifying multi-level FSK signals that have been mixed down with no frequency offset, the situation changes dramatically when the multi-level FSK signal is mixed down by the front-end mixer 104 having a frequency offset (e.g., 400 Hz). This means that the desired frequency of the IF signal may be off by 400 Hz (e.g., 454.6K).

Figure 5:
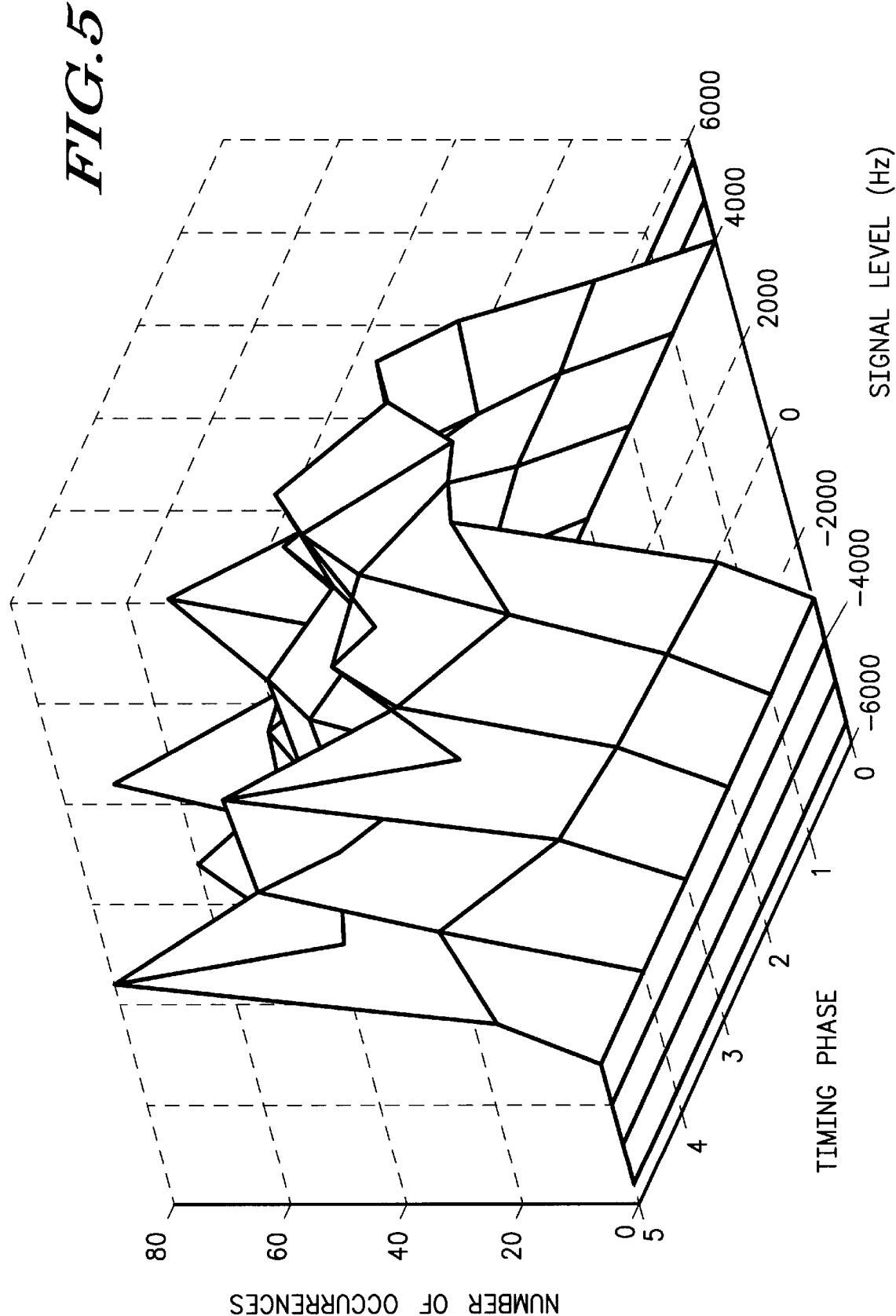
FIG. 5 is a graph depicting a histogram of tallied occurrences for the 6400 bits per second (bps) 4-level FSK signal with a 400 Hz offset.

FIG. 5 depicts a histogram of tallied occurrences for the 6400 bps 4-level FSK signal with a 400 Hz offset. As is evident from the graph, the four distinct peaks of FIG. 2 are not present. The reason for this loss of information is that the resolution of the signal level ranges (i.e., 800 Hz) used in FIG. 2 for tallying occurrences is not effective in characterizing a multi-level FSK signal when a frequency offset is present.

Figure 6:
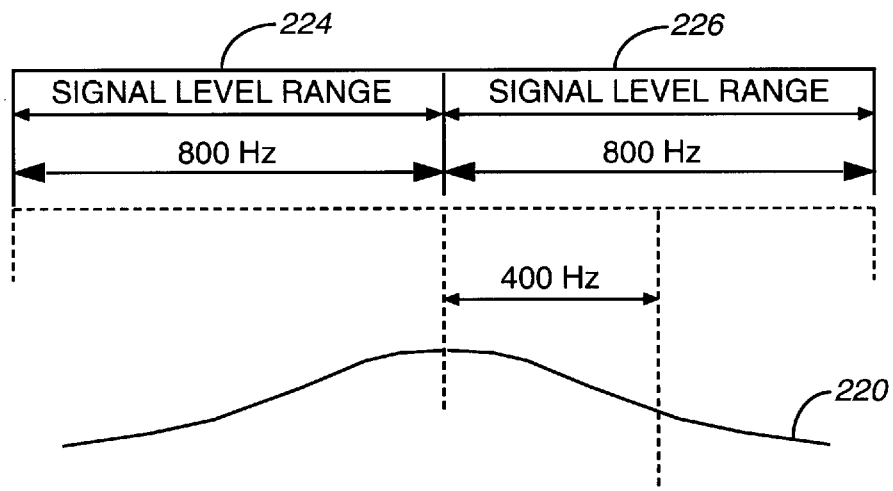
FIG. 6 illustrates why the histogram of FIG. 2 is distorted when there is a frequency offset in the multi-level FSK signal.

FIG. 6 illustrates why the distorted histogram of FIG. 5 results. FIG. 6 shows a symbol 220 centered about the boundary between two signal level ranges 224, 226. The symbol 220 is centered about this boundary, because of a 400 Hz frequency offset. In a situation such as this, half of the baseband samples occurring at a phase where the samples land on a symbol frequency deviation (see FIGS. 3 and 4) will, on average, be tallied by a category corresponding to signal level range 224, and the other half in a category corresponding to signal level range 226.

By spreading occurrences of baseband samples between signal level ranges 224, 226, it becomes less probable that four distinct peaks will result after all baseband samples have been tallied over a 90 ms sampling window (i.e., the result of FIG. 5). However, as the frequency offset is minimized, the likelihood that four distinct peaks will show is increased.

Figure 7:
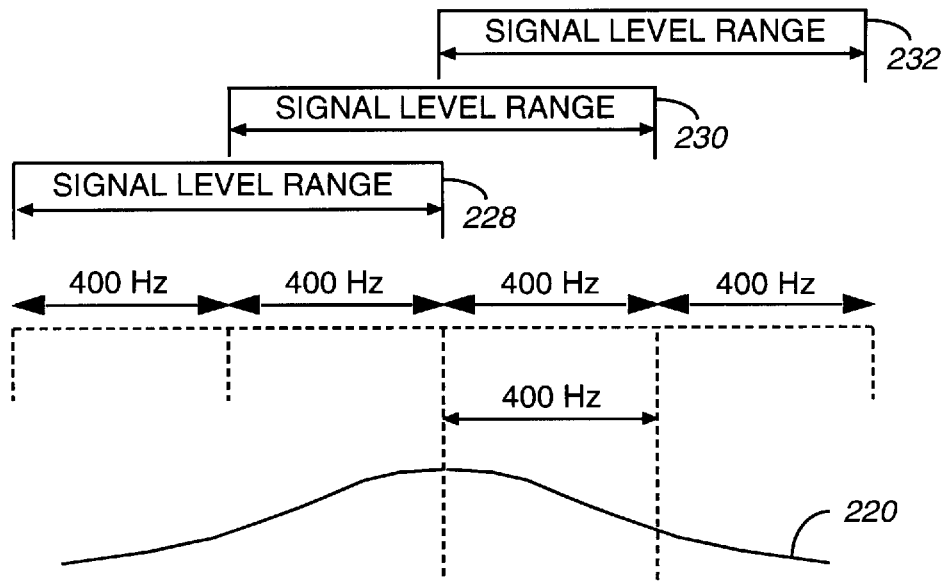
FIG. 7 illustrates how the resolution of the histogram of FIG. 2 is increased to overcome the frequency offset in the multi-level FSK signal.

To alleviate the problem of the front-end mixer 104 mixing down a multi-level FSK signal with a frequency offset, the resolution of the histogram is increased by overlapping signal level ranges 228, 230, 232 as shown in FIG. 7. The effect of overlapping signal level ranges 228, 230, 232 is to double the resolution of the histogram of FIG. 2 (i.e., from 800 Hz to 400 Hz).

FIG. 7 shows the case of symbol 220, which previously had baseband samples occurring at a signal level range boundary (i.e., between signal level ranges 224, 226). With overlapping signal level ranges, occurrences of baseband samples are now tallied by all three signal level ranges 228, 230, 232. Since the boundary between signal level ranges 228 and 232 remains centered about symbol 220, each signal level range on average will tally half of all sample occurrences. In contrast, since symbol 220 is centered about signal level range 230, the probability of tallying samples occurring at the symbol frequency deviation is substantially higher. Hence, signal level range 230 has a higher score than signal level ranges 228, 232, thereby overcoming the boundary problem encountered in FIG. 6.

Having overcome the problem of mixing down the multi-level signals with a frequency offset, a first solution of the present invention follows. The digital circuit 112 applies a correlation function to the tallied data to determine whether the signal intercepted by the receiver circuit 100 is the desired 4-level FSK signal. The correlation function uses a desired predetermined template, representative of the desired multi-level FSK signal, i.e., the 4-level FSK signal, to detect its presence. The desired predetermined template follows the sequence:

$$w_4=[1100110011011].$$

The subscript of the desired predetermined template ($w_4$) is representative of a desired 4-level FSK signal template. Each data bit of the desired predetermined template is representative of a frequency range of 400 Hz. Two consecutive "1's" represent a signal level range of 800 Hz, and the positions of the logical "1's" represent a desired 4-level FSK signal with frequency deviations at ±800 Hz and ±2400 Hz.

The correlation function follows the formula:

$$C_4(\theta,k) = \sum_{s=0}^{13} w_4(s) h(\theta,s+k), \text{ where } k = -8, -7, \ldots, +7, +8.$$

The correlation function $C_4(\theta,k)$ is a function of phase ($\theta$) and frequency offset (k) of the received multi-level FSK signal. Indexing k between ±8 represents a range of frequency offsets between 0 Hz and ±3200 Hz. The summation index (s) accounts for a shift of 5600 Hz over the tallied data. The correlation function is applied to the tallied data by selecting a phase (e.g., 0, 1, 2, 3, 4 or 5), and selecting a frequency offset of the multi-level FSK signal.

Figure 8:
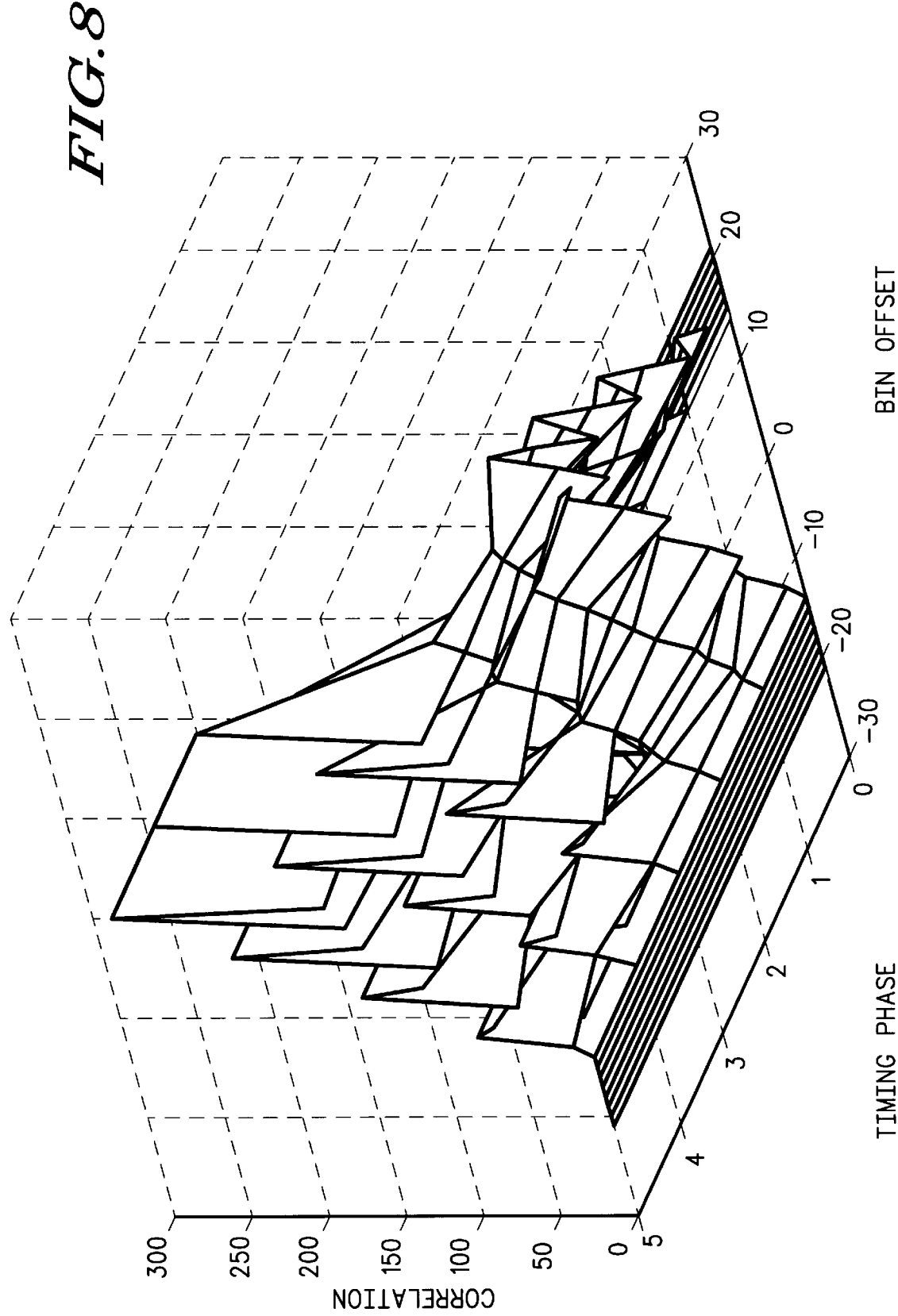
FIG. 8 is a graph depicting correlation results for the 3200 symbols per second (sps) 4-level FSK signal with a 400 Hz offset according to the present invention.

The correlation results for a 3200 sps 4-level FSK signal with a frequency offset of 400 Hz is shown in FIG. 8. This figure comprises three axis's: a phase axis ($\theta$), a frequency offset index axis (k), and a correlation result axis representative of the number of symbols detected for each phase and frequency offset of the multi-level FSK signal. Recall that the number of symbols in a 90 ms sampling window is 288 symbols. Hence, if any of the phases provides a correlation result approximately equal to 288 symbols, then there is an increased degree of confidence that the multi-level FSK signal intercepted by the radio receiver circuit 100 is the desired 4-level FSK signal. In FIG. 8, phases 3, 4 and 5 provide correlation results approximately equal to 288 symbols, thereby indicating the presence of the desired 4-level FSK signal. This result is consistent with the result of FIG. 2.

To determine the highest correlation result, the digital circuit 112 applies a correlation test, which follows the formula: $C_4 = \max[C_4(\theta,k)]$, where $C_4$ is the highest correlation result at any one of the plurality of phases, and at any one of the plurality of frequency offsets of the multi-level FSK signal.

Figure 9:
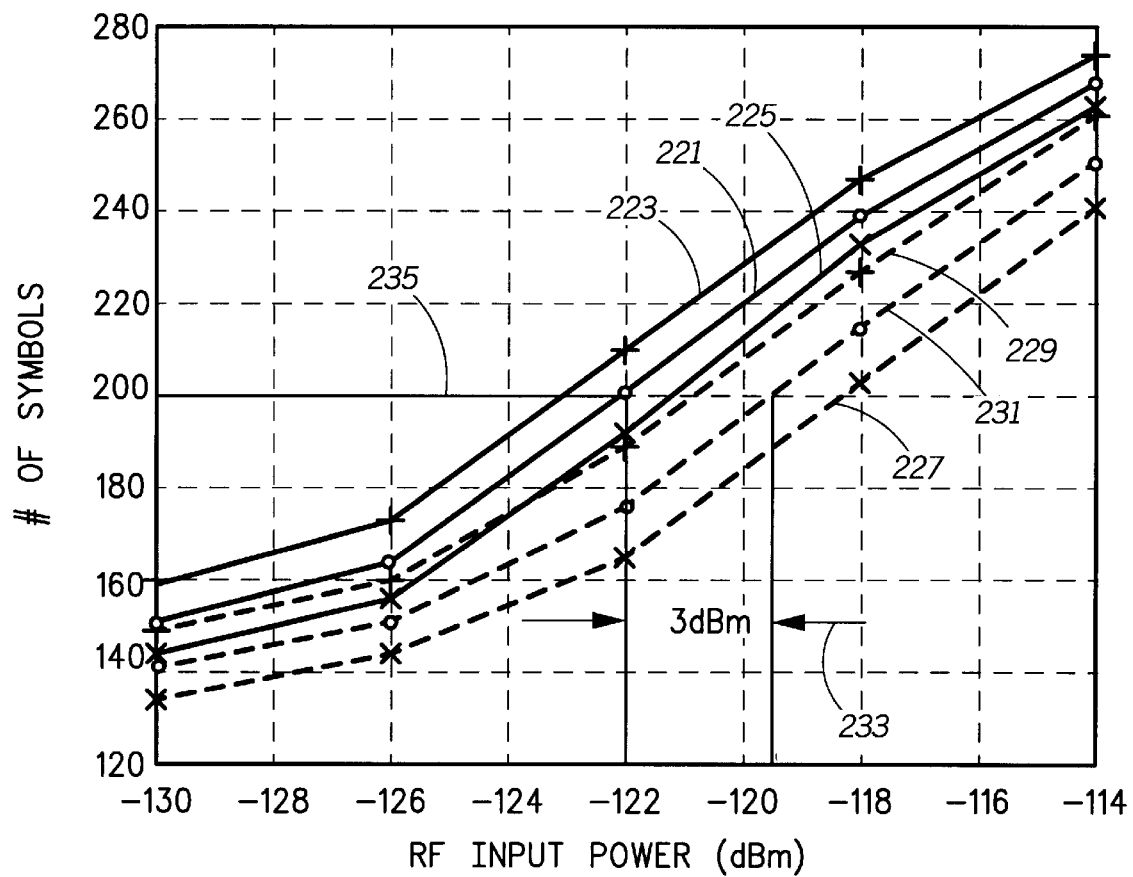
FIG. 9 is a graph depicting the performance of the correlation algorithm as a function of signal power for a 3200 sps 4-level FSK signal with a 200 Hz offset and a 3 KHz offset, respectively, according to the present invention.

FIG. 9 is a graph depicting the performance of the correlation algorithm as a function of signal power for a 3200 sps 4-level FSK signal with a 200 Hz offset and a 3 KHz offset, respectively, according to the present invention. The solid lines are representative of the mean 221 and upper and lower 90% confidence intervals 223, 225 of the correlation results at a frequency offset of 200 Hz. The upper and lower 90% confidence intervals 223, 225 represent the interval for which 90% of the correlation measurements fall, or, alternatively, where 5% of the correlation measurements are above line 223, and 5% below line 225.

Similarly, the dashed lines are representative of the mean 227 and upper and lower 90% confidence intervals 229, 231 of the correlation results at a frequency offset of 3 KHz. It is apparent that the correlation results degrade by 3 dB when there is a 3 KHz offset as shown by the indicator 233. For a noise-only signal intercepted by the radio receiver circuit 100, the correlation results are between 126 and 140 symbols. Using a threshold of 200 symbols shown by the indicator 235, a 4-level signal with a frequency offset of 200 Hz and a signal power of −121 dBm, or a frequency offset of 3 KHz and a signal power of −118 dBm would be detected approximately 95% of the time. Because of this high performance, this threshold is chosen as a first predetermined threshold for the $C_4$ correlation result.

To determine that the desired 4-level FSK signal has "potentially" been intercepted, the digital circuit 112 is adapted to compare the highest correlation result ($C_4$) to the first predetermined threshold. If the highest correlation result is less than or equal to the first predetermined threshold, then the signal is rejected.

This correlation result provides only a first indication in the classification of the multi-level FSK signal intercepted by the radio receiver circuit 100. The possibility remains for an incorrect classification.

Figure 10:
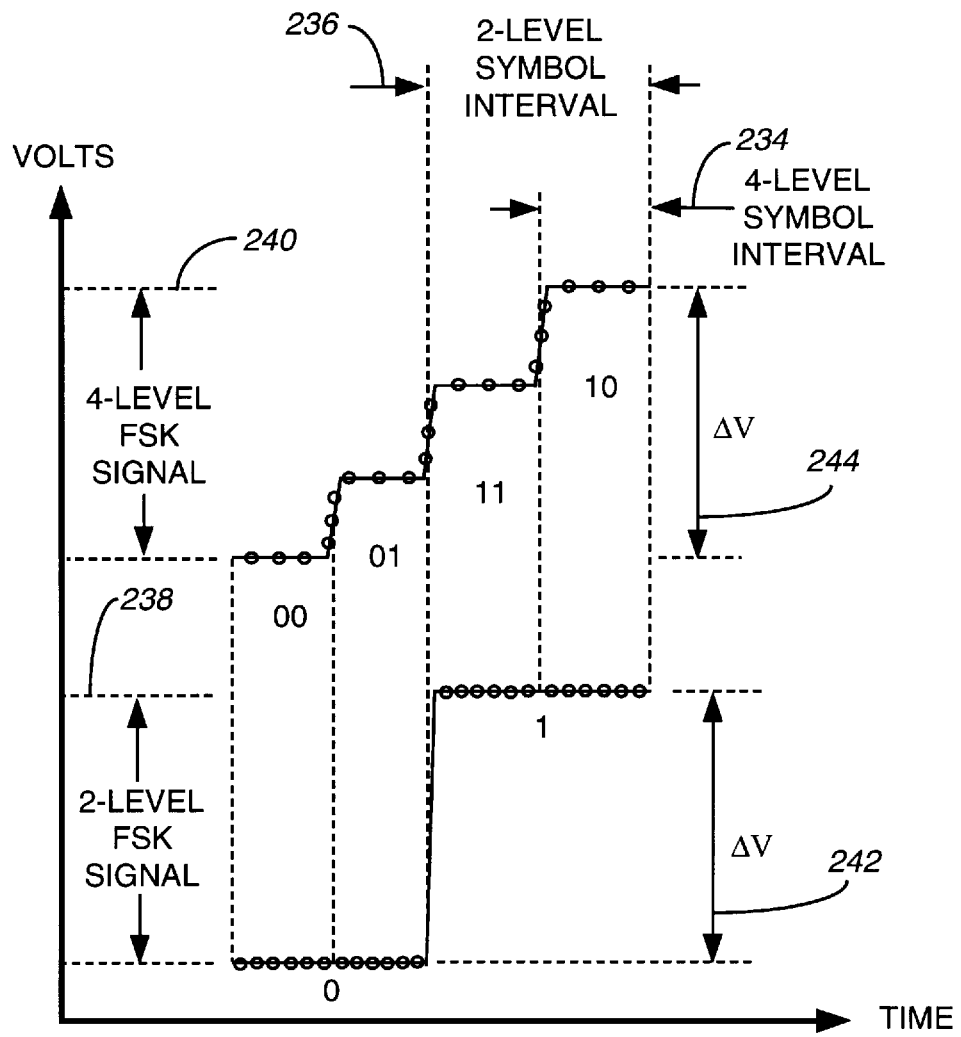
FIG. 10 is a diagram of a 2-level FSK signal sampled at a rate that results in a false classification of the multi-level FSK signal.

A false classification occurs when a 2-level FSK signal (that uses the same outer deviations as the desired 4-level FSK signal, i.e., ±2400 Hz) is intercepted by the radio receiver circuit 100, and is sampled as a 4-level FSK signal. The effect of oversampling the 2-level FSK signal can lead to a correlation result that is substantially the same as $C_4$ calculated above, thereby falsely satisfying the first predetermined threshold test discussed above. FIG. 10 illustrates this situation by showing a 4-level FSK signal 240 (at 3200 sps) and a 2-level FSK signal 238 (at 1600 sps) sampled at 19.2 KHz (the sampling rate for the desired 4-level FSK signal). For clarity, both signals are assumed to have no frequency offset, i.e., all baseband samples occur at 2-level and 4-level symbol intervals 236, 234, respectively. As expected, the ADC 111 generates six baseband samples per symbol for the 4-level FSK signal, and twelve baseband samples per symbol for the 2-level FSK signal (see FIG. 10 for the number of circles per symbol of the 2-level FSK signal and 4-level FSK signal).

Since the outer symbols of the 4-level FSK signal are identical in signal level to the outer symbols of the 2-level FSK signal (i.e., the voltage levels 242, 244 of the outer symbols are the same), the 2-level symbol identified as "0" is interpreted by the digital circuit 112 as a 4-level symbol identified as "00" and the 2-level symbol identified as "1" is interpreted by the digital circuit 112 as a 4-level symbol identified as "10." As a result, the 2-level symbol is processed by the digital circuit 112 as a 4-level FSK signal having a sequence of four consecutive symbols: "00," "00," "10," and "10." Thus, a 2-level FSK signal looks like a 4-level FSK signal with only the outer frequency deviations active. In this situation, the correlation results for $C_4$ surpasses the first predetermined threshold, i.e., the 200 symbols. As a result, the digital circuit 112 falsely classifies the 2-level FSK signal as a 4-level FSK signal.

To remedy this situation, a second solution of the present invention follows. The digital circuit 112 applies a second correlation function to the data tallied in order to determine whether the multi-level signal is a submultiple level of the desired 4-level FSK signal (i.e., a 2-level FSK signal). The second correlation function comprises an undesired predetermined template, which follows the sequence:

$$w_2 = [1111000000001111].$$

Similar to the previous predetermined template, The subscript of the undesired predetermined template ($w_2$) is representative of an undesired 2-level FSK signal template. Each data bit of the undesired predetermined template is representative of a frequency range of 400 Hz. Four consecutive "1's" represent a signal level range of 1600 Hz, and the positions of the logical "1's" represent an undesired 2-level FSK signal with deviations at ±2400 Hz. Note the signal level range chosen is 1600 Hz instead of 800 Hz. This is done because 2-level FSK signaling is more tolerant to noise than is 4-level FSK signaling and therefore a larger signaling range can be used.

The correlation function follows the formula:

$$C_2(\theta,k) = \sum_{s=0}^{15} w_2(s) h(\theta, s+k), \text{ where } k = -8, -7, \ldots, +7, +8.$$

The correlation function $C_2(\theta,k)$ is a function of phase ($\theta$) and frequency offset (k) of the multi-level FSK signal. As before, indexing k between ±8 represents a range of frequency offsets between 0 Hz and ±3200 Hz. The summation index (s) in this formula accounts for a shift of 6400 Hz over the tallied data. As described earlier, the correlation function is applied to the tallied data by selecting a phase (e.g., 0, 1, 2, 3, 4 or 5), and selecting a frequency offset of the multi-level PSK signal.

To determine the highest correlation result, the digital circuit 112 applies a second correlation test, which follows the formula: $C_2 = \max[C_2(\theta,k)]$, where $C_2$ is the maximum correlation result at any one of the plurality of phases, and at any one of the plurality of frequency offsets of the multi-level FSK signal.

Figure 11:
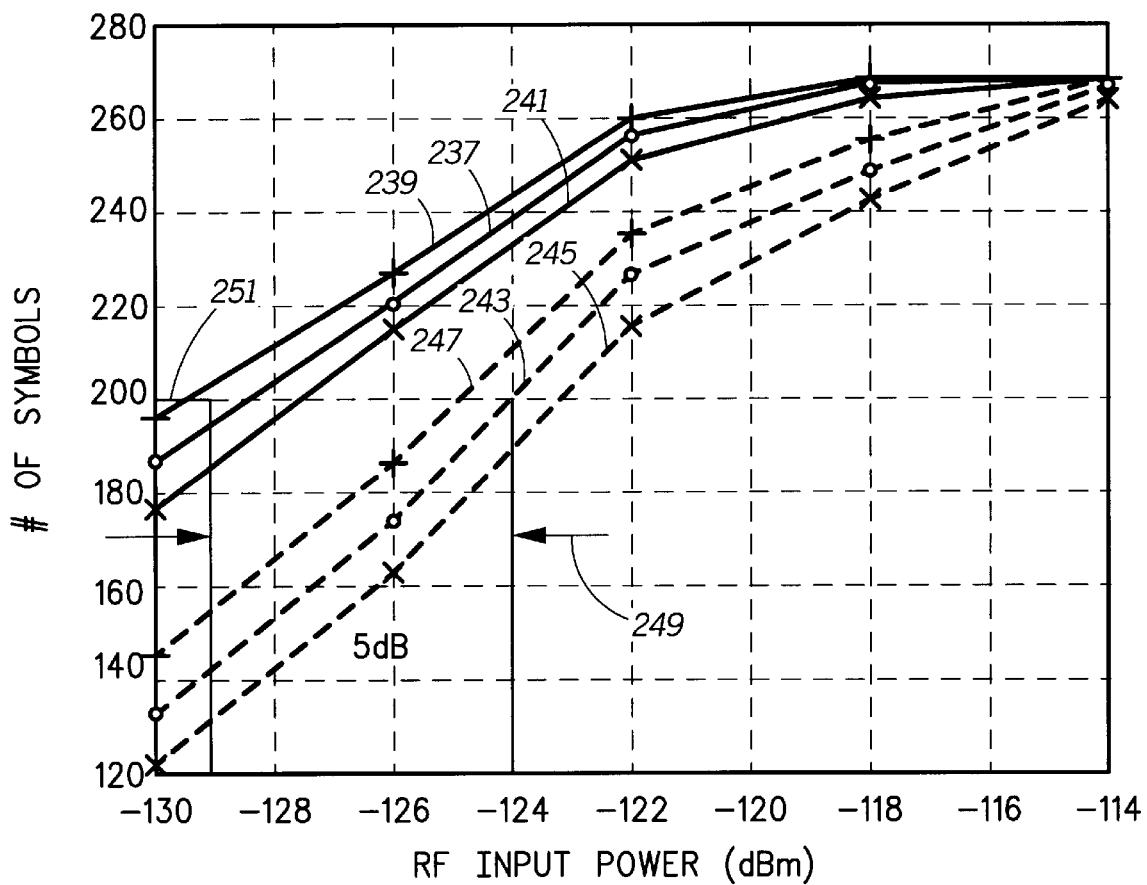
FIG. 11 is a graph depicting the performance of the correlation algorithm as a function of signal power for a 1600 sps 2-level FSK signal with a 200 Hz offset and 3000 Hz offset, respectively, according to the present invention.

FIG. 11 is a graph depicting the performance of the correlation algorithm as a function of signal power for a 1600 sps 2-level FSK signal with a 200 Hz offset and a 3 KHz offset, respectively, according to the present invention. Similar to the graph in FIG. 9, the solid lines in FIG. 11 are representative of the mean 237 and upper and lower 90% confidence intervals 239, 241 of the correlation results at a frequency offset of 200 Hz. The dashed lines are representative of the mean 243 and upper and lower 90% confidence intervals 245, 247 of the correlation results at a frequency offset of 3 KHz. The correlation results in this case degrade by 5 dB (shown by indicator 249) when there is a 3 KHz offset (in contrast to 3 dB in FIG. 9). This is because only outer symbols contribute to the correlation results, and large frequency offsets degrade the signal-to-noise ratio significantly.

For a noise-only multi-level signal intercepted by the radio receiver circuit 100, the correlation results are between 116 and 131 symbols. Using a threshold of 200 symbols (shown by indicator 251), a 2-level FSK signal with a frequency offset of 200 Hz and a signal power of −128 dBm, or a frequency offset of 3 KHz and a signal power of −123 dBm would be detected 95% of the time. Because of this high performance, this threshold is chosen as a second predetermined threshold for the $C_2$ correlation result.

To determine that an undesired 2-level FSK signal has been intercepted, the digital circuit 112 is adapted to compare the highest correlation result ($C_2$) to the second predetermined threshold. If the highest correlation result is greater than or equal to the second predetermined threshold, then the 2-level FSK signal is rejected.

By applying the two correlation functions discussed above, the digital circuit 112 is able to classify the levels of a multi-level signal reliably. However, even though the above algorithm can correctly detect a 4-level FSK signal, it provides no indication whether the 4-level FSK signal has the desired baud rate. In this example, the desired baud rate is 3200 sps, and not 1600 sps or any other submultiple baud rate of a 4-level FSK signal. To classify the 4-level FSK signal according to a desired baud rate, the digital circuit 112 is adapted to calculate an array of summations. The summations follow the formulas:

$$B_{3200,e}(\theta) = \sum_{n_{even}} |s(6n + \theta) - s(6n - 6 + \theta)|, \text{ and}$$

$$B_{3200,o}(\theta) = \sum_{n_{odd}} |s(6n + \theta) - s(6n - 6 + \theta)|,$$

where n is a symbol index, $s(6n+\theta)$ is a signal level of a baseband sample at a particular phase for a selected symbol, and $s(6n-6+\theta)$ is a signal level of a baseband sample at the same phase for an immediately preceding (i.e., adjacent) symbol. The symbol index n is selected to skip every other symbol in the total batch of symbols accumulated in a sampling window of 90 ms. Recalling that the total batch of symbols is 288, $n_{even}$ represents even symbols in the batch of 288 symbols, while $n_{odd}$ represents odd symbols in the same batch.

Figure 12:
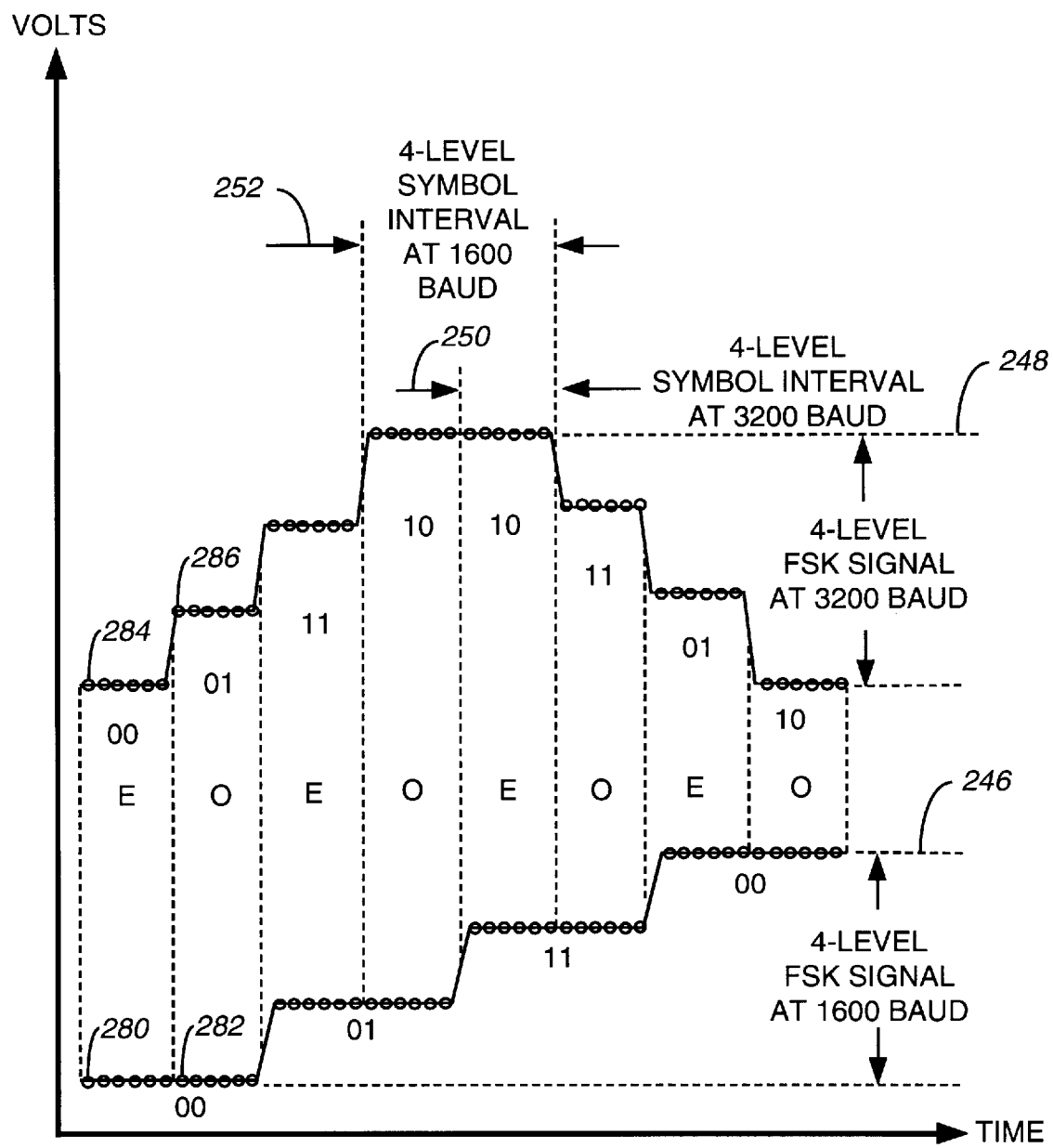
FIG. 12 is a diagram of two 4-level FSK signals at a baud rate of 3200 sps and 1600 sps, respectively, each FSK signal sampled at a rate of 19.2 KHz.

FIG. 12 is a diagram of two 4-level FSK signals 248, 246 at a baud rate of 3200 sps and 1600 sps, respectively. FIG. 12 depicts with dashed lines the symbol intervals 250 of the 4-level FSK signal at 3200 sps. Note that each symbol of the 4-level FSK signal at 1600 sps comprises two symbol intervals 252 of the 4-level FSK signal at 3200 sps. Also, each symbol is designated as either an even symbol (marked by the letter "E") or an odd symbol (marked by the letter "O").

The principle behind the baud rate classification algorithm is that at least one of the plurality of summations generated by $B_{3200,e}(\theta)$, and $B_{3200,o}(\theta)$ will have a result substantially low when an intercepted 4-level FSK signal has an undesired submultiple baud rate such as, for example, 1600 baud. Take for example the first odd symbol in FIG. 12. To use the equation $B_{3200,o}(\theta)$, a plurality of absolute subtractions must be calculated. Each subtraction corresponds to a difference between a signal level of a sample of one of the plurality of symbols and a signal level of a corresponding sample of an adjacent symbol.

It is clear from FIG. 12 that the preceding symbol to an odd symbol is always an even symbol. Since each pair of odd and even symbols is at the same signal level for the 4-level FSK signal at 1600 sps, the result for each subtraction, based on the difference between samples at the same phase, is zero. For example, samples 280, 282 are at the same phase (i.e., phase 0) and signal level. Subtracting the signal level of these samples 280, 282 provides a result substantially equal to zero. Applying the same subtraction to subsequent phases also provides a result substantially equal to zero. The subtraction results are not zero for the 4-level FSK signal at 3200 sps. In that situation, even and odd symbols have baseband samples at different signal levels. For example, the difference between the signal level of samples 284, 286 (i.e., phase θ) provides a non-zero result. Applying the same subtraction to subsequent phases also provides a non-zero result.

The subtractions, just discussed, are calculated for all symbols accumulated in the 90 ms sampling window, thereby providing a plurality of absolute subtractions. For a 4-level FSK signal at 3200 sps, sampled by the ADC 111 at 19.2 KHz, there are 1728 baseband samples in a 90 ms sampling window. Subtracting signal levels between samples of adjacent symbols at each phase results in a total of 864 subtractions for $B_{3200,o}(\theta)$.

Once the plurality of absolute subtractions have been determined, a plurality of summations is then calculated, each summation corresponding to additions of selected ones of the plurality of absolute subtractions. The additions are determined by phase. That is, all subtractions for phase 0 are added together to form one summation, and so on. For the 4-level FSK signal at 3200 sps, $B_{3200,e}(\theta)$ comprises six summations based on the six phases of θ. Similarly, $B_{3200,o}(\theta)$ comprises six summations based on the six phases of θ. Hence, a total of twelve summations results.

Alternatively, the correlation result $C_4$, which identifies the best sampling phase $\theta_4$ of the 4-level FSK signal, can be used to reduce the number of calculations of $B_{3200,e}(\theta)$, and $B_{3200,o}(\theta)$. This is accomplished by calculating $B_{3200,e}(\theta)$, and $B_{3200,o}(\theta)$ only for the phase ($\theta_4$). This results in only one summation for $B_{3200,e}(\theta)$, and one summation for $B_{3200,o}(\theta)$.

In determining that the 4-level FSK signal has an undesired baud rate, the digital circuit 112 applies a baud rate test, which follows the formula: $B_{3200}=\min[B_{3200,e}(\theta_4), B_{3200,o}(\theta_4)]$, where $B_{3200}$ is the lowest summation result of both equations.

Note that consecutive symbols of the two 4-level FSK signals shown in FIG. 12 have purposely been chosen to be different (i.e., differing levels). In actual practice, consecutive symbols are frequently the same. Although this may happen in practice, the samples accumulated over a 90 ms sampling window are generally random and therefore include situations where consecutive symbols are not at the same signal level. Based on this assumption, a 4-level FSK signal at 1600 sps will generate summations substantially lower than the summations calculated for a 4-level FSK signal at 3200 sps.

Figure 13:
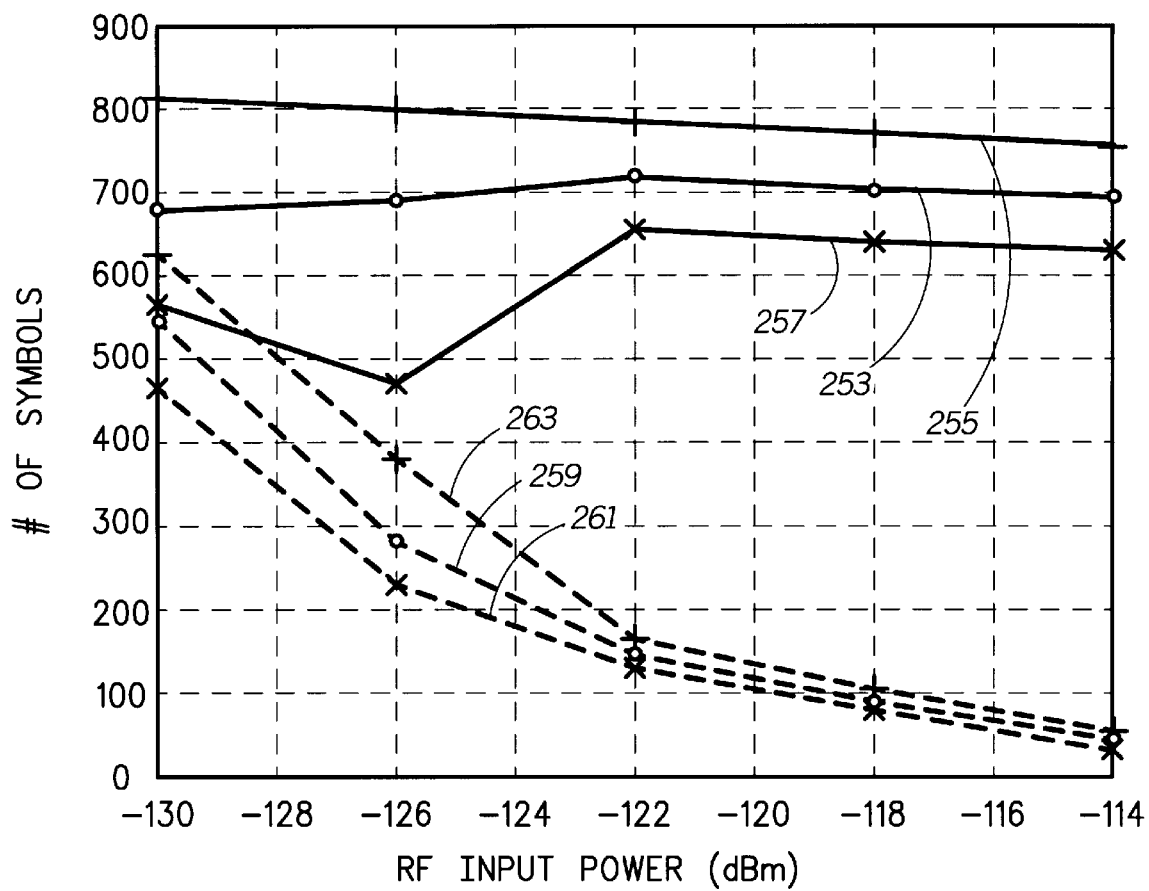
FIG. 13 is a graph depicting the performance of the baud rate classification algorithm as a function of signal power according to the present invention.

FIG. 13 is a graph depicting the performance of the baud rate classification algorithm as a function of signal power according to the present invention. This graph depicts by dashed lines a mean 259 and upper and lower 90% confidence intervals 261, 263 of a 4-level FSK signal at 1600 sps with a frequency offset of 200 Hz, and by solid lines a mean 253 and upper and lower 90% confidence intervals 255, 257 of a 4-level FSK signal at 3200 sps also with a frequency offset of 200 Hz. As is apparent from FIG. 13, the summation results are very high for the 4-level FSK signal at 3200 sps (mean of approximately 720). At −130 dBm, the 4-level FSK signal at 1600 sps has a summation result of approximately 450. Using this as a third predetermined threshold, the digital circuit 112 is adapted to select at least one summation based on the algorithm described above, and to reject the multi-level FSK signal if a lowest value of the at least one summation is below the third predetermined threshold.

Figure 14:
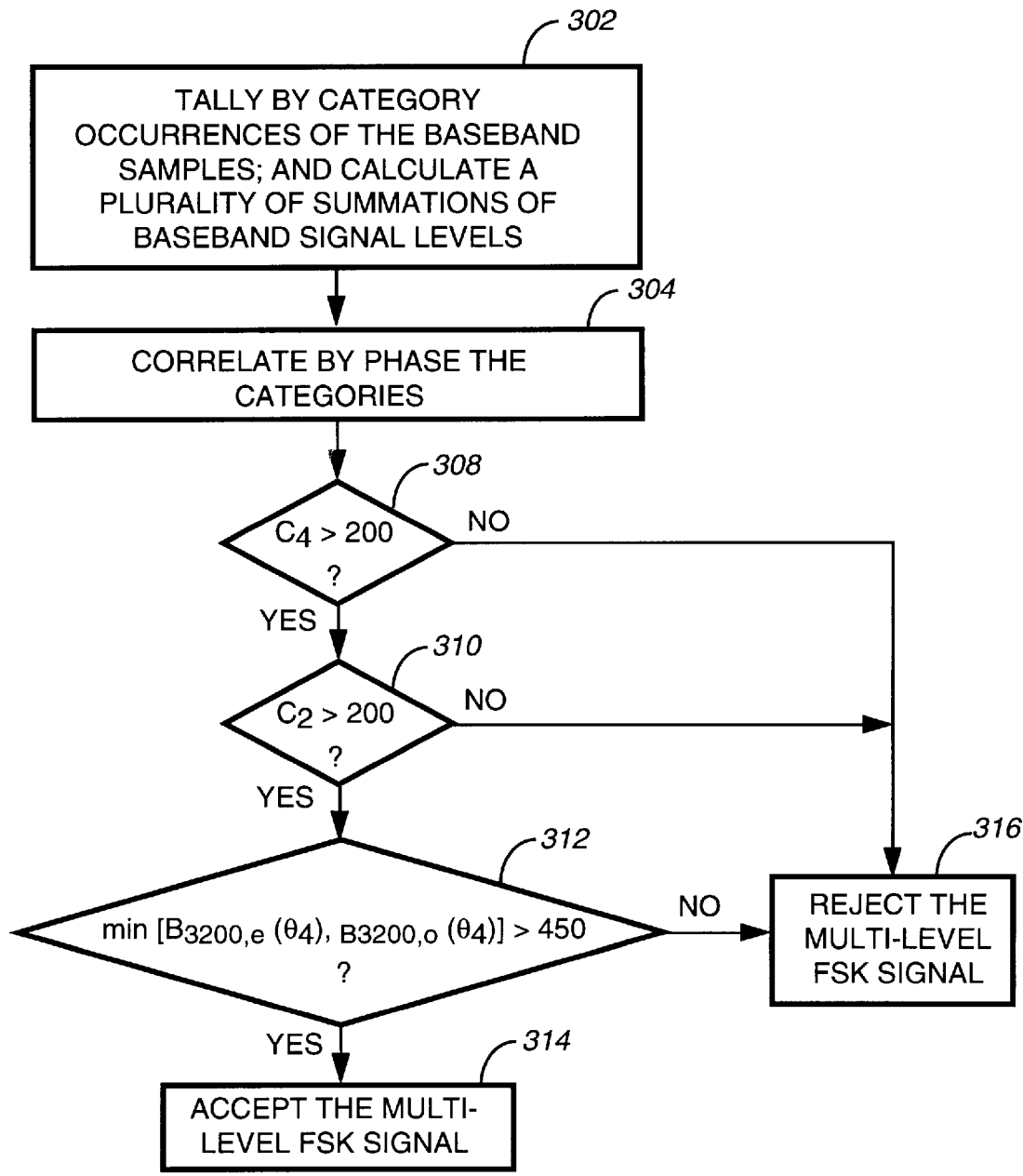
FIG. 14 is a flow chart summarizing the operation of the digital circuit according to the present invention.

FIG. 14 provides a flow chart 300 summarizing the operation of the digital circuit 112 according to the present invention. As mentioned earlier, the digital circuit 112 implements the processing steps of flow chart 300 either with an algorithmic state machine or a software-based processing system.

The flow chart 300 begins with step 302 where the digital circuit 112 tallies, by category, occurrences of the baseband samples as described above. In the same step, the digital circuit 112 calculates a plurality of summations for baseband signal level differences as described above (i.e., $B_{3200,e}(\theta_4)$ and $B_{3200,o}(\theta_4)$). By tallying occurrences and calculating the plurality of summations in the same step, the digital circuit 112 need not store baseband samples, thereby minimizing memory utilization.

In step 304, the digital circuit 112 correlates, by phase, the categories to a desired predetermined template and undesired predetermined template, each template representative of a 4-level FSK signal and a 2-level FSK signal, respectively. The digital circuit 112, then proceeds to the comparison steps 308, 310, 312, which together form the decision making process for classifying the multi-level signal by the number of signal levels and by baud rate, respectively.

In step 308, the highest correlation value for $C_4$ is compared to the first predetermined threshold (set at 200 symbols). If $C_4$ is less than or equal to 200 symbols, then the digital circuit 112 proceeds to step 316 where it rejects the multilevel FSK signal. If, however, $C_4$ is greater than 200 symbols, the digital circuit 112 proceeds to step 310. In step 310, the highest correlation value for $C_2$ is compared to the threshold of 200 symbols. If $C_2$ is greater than or equal to 200 symbols, then the multi-level FSK signal is rejected in step 316. If, however, $C_2$ is less than 200 symbols, then the digital circuit 112 proceeds to step 312. By satisfying steps 308 and 310, the digital circuit 112 has classified the intercepted multi-level FSK signal as a desired 4-level FSK signal.

Step 312 is utilized for classifying the baud rate of the 4-level FSK signal. If either $B_{3200,e}(\theta_4)$ or $B_{3200,o}(\theta_4)$ is substantially is less than 450, then the 4-level FSK signal is rejected in step 316. If both summations are above 450, then the digital circuit 112 classifies the 4-level FSK signal as having the desired baud rate of 3200 sps. Having satisfied step 312, the digital circuit 112 proceeds to step 314 where the 4-level FSK signal is accepted as the desired multi-level signal.

The radio receiver circuit 100 just described has several advantages over the prior art. First, the radio receiver circuit 100 is insensitive to threshold calculation errors as made by traditional baud rate detectors. Second, it is able to distinguish between multi-level signals and the baud rate of such signals. Traditional baud rate detectors can only determine the baud rate of a multi-level signal, and are often subject to incorrectly accepting a multi-level signal with the wrong levels.

Figure 15:
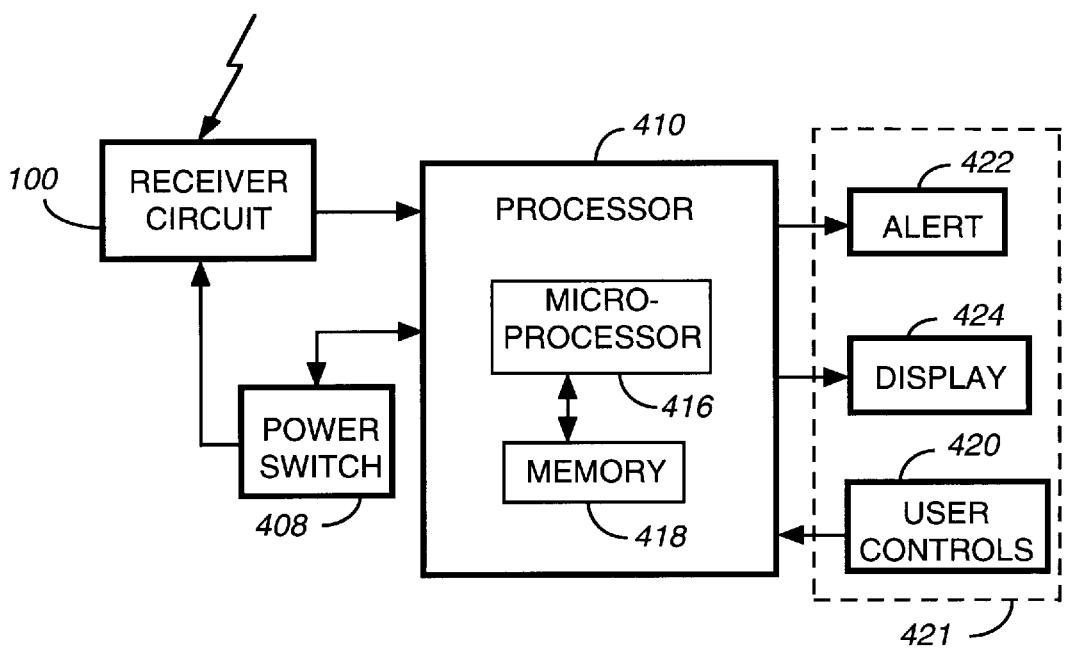
FIG. 15 is an electrical block diagram of an SCR utilizing the radio receiver circuit of FIG. 1.

FIG. 15 is an electrical block diagram of a SCR 400 utilizing the radio receiver circuit 100 according to the present invention. The SCR 400 comprises a power switch 408, the radio receiver circuit 100, a processor 410, and a user interface 421. The radio receiver circuit 100 is utilized for receiving messages transmitted by a radio communication system and operates in the manner described above. It will be appreciated that the digital circuit 112 can be implemented by the elements of the processor 410 under software control as described for FIG. 14.

The power switch 408 is a conventional switch, such as a MOS (metal oxide semiconductor) switch for controlling power to the radio receiver circuit 100 under the direction of the processor 410, thereby providing a battery saving function.

The processor 410 is used for controlling operation of the SCR 400. Generally, its primary function is to decode and process demodulated messages provided by the radio receiver circuit 100, storing them and alerting a user of the received message. To perform this function, the processor 410 comprises a conventional microprocessor 416 coupled to a conventional memory 418 having nonvolatile and volatile memory portions, such as a ROM (read-only memory) and RAM (random-access memory). One of the uses of the memory 418 is for storing messages received from the radio communication system. Another use is for storing one or more selective call addresses utilized in identifying incoming personal or group messages to be intercepted by the SCR 400.

Once a message has been decoded and stored in the memory 418, the processor 410 activates the alerting device 422 (included in the user interface 421) which generates a tactile and/or audible alert signal to the user. The user interface 421, which further includes, for example, a conventional LCD display 424 and conventional user controls 420, is utilized by the user for processing the received messages. This interface provides options such as reading, deleting, and locking of messages. Alternatively, other types of user interfaces can be used, e.g., a conventional audio interface with or without an LCD.

To communicate messages to the SCR's 400, the radio communication system utilizes a protocol such as the ReFLEX protocol, developed by Motorola, Inc. (ReFLEX is a trademark of Motorola, Inc.) for transmitting synchronous messages. The ReFLEX protocol is a digital selective call signaling protocol that is presently used by various system operators in the United States and in several other countries. Alternatively, other signaling protocols that are suitable to the present invention can be used.

What is claimed is:

1. In a radio receiver that receives a multi-level signal from a radio communication system, wherein each level is representative of a symbol of data and wherein the multi-level signal comprises a plurality of symbols, a method for classifying the multi-level signal, comprising:

receiving the multi-level signal;

demodulating the multi-level signal to provide baseband samples for each symbol, each sample having a phase and a signal level;

tallying, by category, occurrences of the baseband samples, wherein each category is representative of one of a plurality of phases, and one of a plurality of signal level ranges;

correlating by phase the categories to a desired predetermined template;

correlating by phase the categories to an undesired predetermined template; and classifying the multi-level signal by its level according to the correlation results.

2. The method as recited in claim 1, wherein the classification step comprises:

rejecting the multi-level signal if a correlation result of each of the plurality of phases fails to substantially match the desired predetermined template or if at least one correlation result substantially matches the undesired predetermined template; and accepting the multi-level signal if it is not rejected.

3. The method as recited in claim 2, wherein the step of rejecting the multi-level signal according to the desired predetermined template includes:

comparing the at least one correlation result to a predetermined threshold; and rejecting the multi-level signal if the at least one correlation result is less than or equal to the predetermined threshold.

4. The method as recited in claim 2, wherein the step of rejecting the multi-level signal according to the undesired predetermined template includes:

comparing the at least one correlation result to a predetermined threshold; and rejecting the multi-level signal if the at least one correlation result is greater than or equal to the predetermined threshold.

5. The method as recited in claim 1, wherein the desired predetermined template is representative of a desired multi-level signal; and wherein the undesired predetermined template is representative of an undesired multi-level signal.

6. The method as recited in claim 1, further classifying the multi-level signal by its baud rate, comprising the steps of:

calculating a plurality of absolute subtractions, each subtraction corresponding to a difference between a signal level of a sample of one of the plurality of symbols and a signal level of a corresponding sample of an adjacent symbol;

calculating a plurality of summations, each summation corresponding to additions of selected ones of the plurality of absolute subtractions;

selecting at least one summation from the plurality of summations;

determining a lowest value of the at least one summation;

comparing the lowest value to a predetermined threshold; and rejecting the multi-level signal if the lowest value is below the predetermined threshold.

7. The method as recited in claim 6, wherein the at least one summation is selected according to one of the plurality of phases having a highest correlation result corresponding to the desired predetermined template.

8. In a radio receiver that receives a multi-level signal from a radio communication system, wherein each level is representative of a symbol of data and wherein the multi-level signal comprises a plurality of symbols, a method for rejecting the multi-level signal based on an undesireable baud rate, comprising:

receiving the multi-level signal;

demodulating the multi-level signal to provide baseband samples for each symbol, each sample having a phase and a signal level;

calculating a plurality of absolute subtractions, each subtraction corresponding to a difference between a signal level of a sample of one of the plurality of symbols and a signal level of a corresponding sample of an adjacent symbol;

calculating a plurality of summations, each summation corresponding to additions of selected ones of the plurality of absolute subtractions;

selecting at least one summation from the plurality of summations;

determining a lowest value of the at least one summation;

comparing the lowest value to a predetermined threshold representative of a minimum baud rate threshold; and rejecting the multi-level signal if the lowest value is below the predetermined threshold.

9. In a radio receiver that receives a multi-level signal from a radio communication system, wherein each level is representative of a symbol of data and wherein the multi-level signal comprises a plurality of symbols, a method for classifying the multi-level signal by its level, comprising:

receiving the multi-level signal;

demodulating the multi-level signal to provide baseband samples for each symbol, each sample having a phase and a signal level;

tallying, by category, occurrences of the baseband samples, wherein each category is representative of one of a plurality of phases, and one of a plurality of signal level ranges;

correlating by phase the categories to a desired predetermined template, wherein the desired predetermined template is representative of a desired multi-level signal;

comparing a highest correlation result according to the desired predetermined template to a first predetermined threshold;

rejecting the multi-level signal if the highest correlation result is less than or equal to the first predetermined threshold;

correlating by phase the categories to an undesired predetermined template, wherein the undesired predetermined template is representative of an undesired multi-level signal;

comparing a highest correlation result according to the undesired predetermined template to a second predetermined threshold;

rejecting the multi-level signal if the highest correlation result is greater than or equal to the second predetermined threshold; and accepting the multi-level signal if it is not rejected.

10. In a radio receiver that receives a multi-level signal from a radio communication system, wherein each level is representative of a symbol of data and wherein the multi-level signal comprises a plurality of symbols, a method for classifying the multi-level signal by its level and baud rate, comprising:

receiving the multi-level signal;

demodulating the multi-level signal to provide baseband samples for each symbol, each sample having a phase and a signal level;

tallying, by category, occurrences of the baseband samples, wherein each category is representative of one of a plurality of phases, and one of a plurality of signal level ranges;

correlating by phase the categories to a desired predetermined template;

comparing a highest correlation result according to the desired predetermined template to a first predetermined threshold;

rejecting the multi-level signal if the highest correlation result is less than or equal to the first predetermined threshold;

correlating by phase the categories to an undesired predetermined template;

comparing a highest correlation result according to the undesired predetermined template to a second predetermined threshold;

rejecting the multi-level signal if the highest correlation result is greater than or equal to the second predetermined threshold;

calculating a plurality of absolute subtractions, each subtraction corresponding to a difference between a signal level of a sample of one of the plurality of symbols and a signal level of a corresponding sample of an adjacent symbol;

calculating a plurality of summations, each summation corresponding to additions of selected ones of the plurality of absolute subtractions;

selecting at least one summation from the plurality of summations;

determining a lowest value of the at least one summation;

comparing the lowest value to a predetermined threshold;

rejecting the multi-level signal if the lowest value is below the predetermined threshold; and accepting the multi-level signal if it is not rejected.

11. A radio receiver circuit for receiving a multi-level signal from a radio communication system, wherein each level is representative of a symbol of data and wherein the multi-level signal comprises a plurality of symbols, comprising:

a demodulator circuit for receiving the multi-level signal and for generating baseband samples for each symbol, each sample having a phase and a signal level;

a digital circuit coupled to the demodulator circuit, wherein the digital circuit is adapted to:

tally, by category, occurrences of the baseband samples, wherein each category is representative of one of a plurality of phases, and one of a plurality of signal level ranges;

correlate by phase the categories to a desired predetermined template;

correlate by phase the categories to an undesired predetermined template; and classify the multi-level signal by its level according to the correlation results.

12. A selective call receiver, comprising:

a radio receiver circuit;

a memory; and a processor coupled to the radio receiver circuit and the memory for processing therewith, wherein the processor is adapted to:

cause the radio receiver circuit to receive the multi-level signal and to generate baseband samples for each symbol, each sample having a phase and a signal level;

tally, by category, occurrences of the baseband samples, wherein each category is representative of one of a plurality of phases, and one of a plurality of signal level ranges;

correlate by phase the categories to a desired predetermined template;

correlate by phase the categories to an undesired predetermined template; and classify the multi-level signal by its level according to the correlation results.

13. A radio receiver circuit for receiving a multi-level signal from a radio communication system, wherein each level is representative of a symbol of data and wherein the multi-level signal comprises a plurality of symbols, comprising:

a demodulator circuit for receiving the multi-level signal and for generating baseband samples for each symbol, each sample having a phase and a signal level;

a digital circuit coupled to the demodulator circuit for classifying the multi-level signal by its baud rate, wherein the digital circuit is adapted to:

calculate a plurality of absolute subtractions, each subtraction corresponding to a difference between a signal level of a sample of one of the plurality of symbols and a signal level of a corresponding sample of an adjacent symbol;

calculate a plurality of summations, each summation corresponding to additions of selected ones of the plurality of absolute subtractions;

select at least one summation from the plurality of summations;

determine a lowest value of the at least one summation;

compare the lowest value to a predetermined threshold; and reject the multi-level signal if the lowest value is below the predetermined threshold.

14. A radio receiver circuit for receiving a multi-level signal from a radio communication system, wherein each level is representative of a symbol of data and wherein the multi-level signal comprises a plurality of symbols, comprising:

a demodulator circuit for receiving the multi-level signal and for generating baseband samples for each symbol, each sample having a phase and a signal level;

a digital circuit coupled to the demodulator circuit for classifying the multi-level signal by its level, wherein the digital circuit is adapted to:

tally, by category, occurrences of the baseband samples, wherein each category is representative of one of a plurality of phases, and one of a plurality of signal level ranges;

correlate by phase the categories to a desired predetermined template, wherein the desired predetermined template is representative of a desired multi-level signal;

compare a highest correlation result according to the desired predetermined template to a first predetermined threshold;

reject the multi-level signal if the highest correlation result is less than or equal to the first predetermined threshold;

correlate by phase the categories to an undesired predetermined template, wherein the undesired predetermined template is representative of an undesired multi-level signal;

compare a highest correlation result according to the undesired predetermined template to a second predetermined threshold;

reject the multi-level signal if the highest correlation result is greater than or equal to the second predetermined threshold; and accept the multi-level signal if it is not rejected.

15. A radio receiver circuit for receiving a multi-level signal from a radio communication system, wherein each level is representative of a symbol of data and wherein the multi-level signal comprises a plurality of symbols, comprising:

a demodulator circuit for receiving the multi-level signal and for generating baseband samples for each symbol, each sample having a phase and a signal level;

a digital circuit coupled to the demodulator circuit for classifying the multi-level signal by its level and baud rate, wherein the digital circuit is adapted to:

tally, by category, occurrences of the baseband samples, wherein each category is representative of one of a plurality of phases, and one of a plurality of signal level ranges;

correlate by phase the categories to a desired predetermined template;

compare a highest correlation result according to the desired predetermined template to a first predetermined threshold;

reject the multi-level signal if the highest correlation result is less than or equal to the first predetermined threshold;

correlate by phase the categories to an undesired predetermined template;

compare a highest correlation result according to the undesired predetermined template to a second predetermined threshold;

reject the multi-level signal if the highest correlation result is greater than or equal to the second predetermined threshold;

calculate a plurality of absolute subtractions, each subtraction corresponding to a difference between a signal level of a sample of one of the plurality of symbols and a signal level of a corresponding sample of an adjacent symbol;

calculate a plurality of summations, each summation corresponding to additions of selected ones of the plurality of absolute subtractions;

select at least one summation from the plurality of summations;

reject the multi-level signal if a lowest value of the at least one summation is below a third predetermined threshold; and accept the multi-level signal if it is not rejected.

* * * * *

UNITED STATES PATENT AND TRADEMARK OFFICE
CERTIFICATE OF CORRECTION

PATENT NO. : 5,832,038
DATED : November 3, 1998
INVENTOR(S) : Stephen R. Carsello It is certified that error appears in the above-identified patent and that said Letters Patent is hereby corrected as shown below:

On the title page, insert the following:

--Relate U.S. Application Data
[60] Provisional application No. 60/021,221, Jul. 3, 1996--

Column 1, line 2, insert the following:

--Cross Reference To Related Application
Reference is made to , and priority claimed from U.S. Provisional Application Ser. No. US 60/021,221, filed Jul. 3, 1996, entitled METHOD AND APPARATUS IN A RADIO COMMUNICATION SYSTEM FOR CLASSIFYING SIGNALS--.

Signed and Sealed this

Twenty-fifth Day of May, 1999

Attest:

Q. TODD DICKINSON

Attesting Officer  Acting Commissioner of Patents and Trademarks